(12) United States Patent
Altheimer et al.

(10) Patent No.: US 7,771,047 B2
(45) Date of Patent: Aug. 10, 2010

(54) ERROR-TOLERANT PROGRESSIVE GLASS DESIGN

(75) Inventors: Helmut Altheimer, Baisweil-Lauchdorf (DE); Gregor Esser, München (DE); Andrea Welk, München (DE); Leonhard Schmid, Raisting (DE); Martin Zimmermann, Erdweg-Kleinberghofen (DE); Kerstin Schmid, Fürstenfeldbruck (DE); Norbet Schmid, München (DE); Jochen Brosig, Grünwald (DE); Winfried Nikolaus, Haar (DE); Werner Müller, Ötisheim (DE); Ilka Schwarz, Geretsried (DE)

(73) Assignee: Rodenstock GmbH, Munich (DE)

( * ) Notice: Subject to any disclaimer, the term of this patent is extended or adjusted under 35 U.S.C. 154(b) by 730 days.

(21) Appl. No.: 10/569,952

(22) PCT Filed: Aug. 17, 2004

(86) PCT No.: PCT/EP2004/009227

§ 371 (c)(1),
(2), (4) Date: Nov. 9, 2006

(87) PCT Pub. No.: WO2005/029160

PCT Pub. Date: Mar. 31, 2005

(65) Prior Publication Data

US 2007/0109496 A1    May 17, 2007

(30) Foreign Application Priority Data

Aug. 29, 2003 (DE) .................................. 103 39 948

(51) Int. Cl.
G02C 7/06       (2006.01)
(52) U.S. Cl. .................... 351/169; 351/177; 351/168
(58) Field of Classification Search .................. 351/169
See application file for complete search history.

(56) References Cited

U.S. PATENT DOCUMENTS

| | | | | |
|---|---|---|---|---|
| 6,412,948 B2 * | 7/2002 | Yanari | ...................... | 351/169 |
| 6,652,096 B1 * | 11/2003 | Morris et al. | .............. | 351/169 |
| 6,712,467 B1 * | 3/2004 | Kitani | ...................... | 351/169 |
| 2004/0032565 A1 * | 2/2004 | Yamakaji et al. | ............ | 351/177 |

FOREIGN PATENT DOCUMENTS

| | | |
|---|---|---|
| EP | 0 911 670 A1 | 4/1999 |
| EP | 1 170 620 A1 | 1/2002 |
| WO | WO 01/81981 A2 | 11/2001 |

* cited by examiner

*Primary Examiner*—Jessica T Stultz
(74) *Attorney, Agent, or Firm*—Crowell & Moring LLP

(57) ABSTRACT

A method of producing a progressive spectacle glass by defining an ordering value for the average use value in the far reference point of the progressive spectacle glass, calculating the progressive spectacle glass while taking into account a calculation value of the average use value in the far reference point, the calculation value having a negative desired refraction deviation between 0.03 dpt and 0.2 dpt with respect to the ordering value in the far reference point, and producing the calculated progressive spectacle glass.

18 Claims, 15 Drawing Sheets

FIG 1a          Stand der Technik
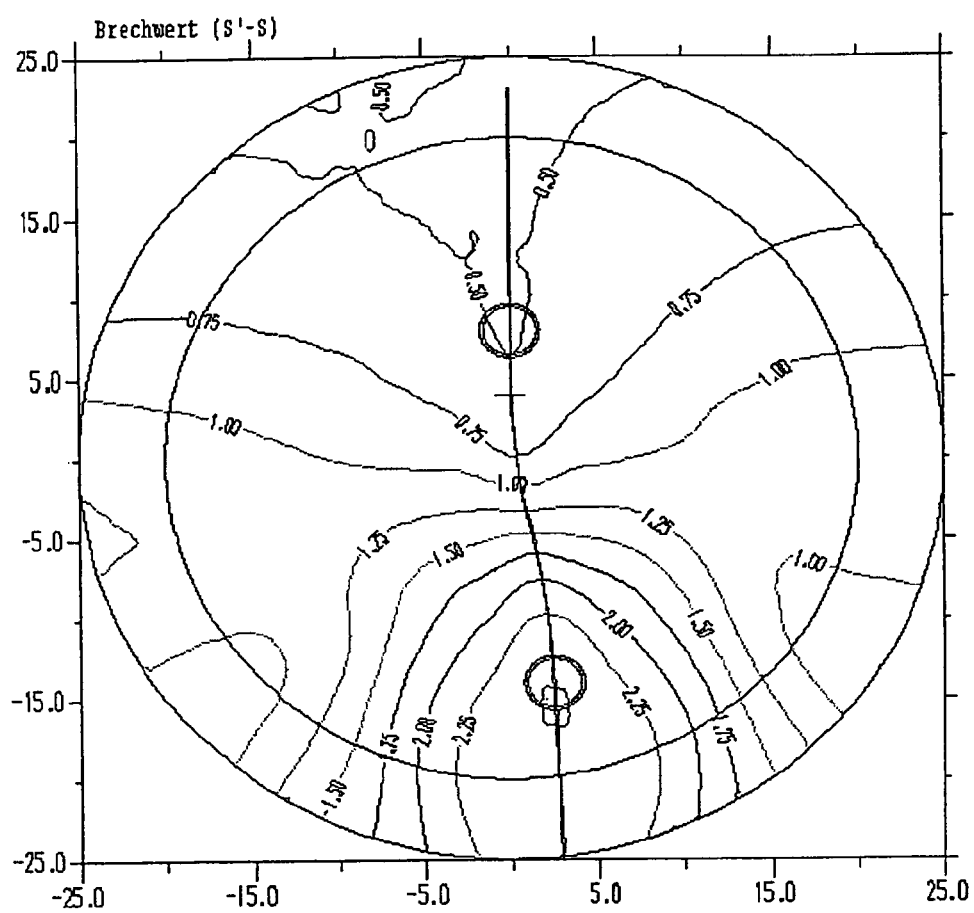

FIG 2a  Stand der Technik
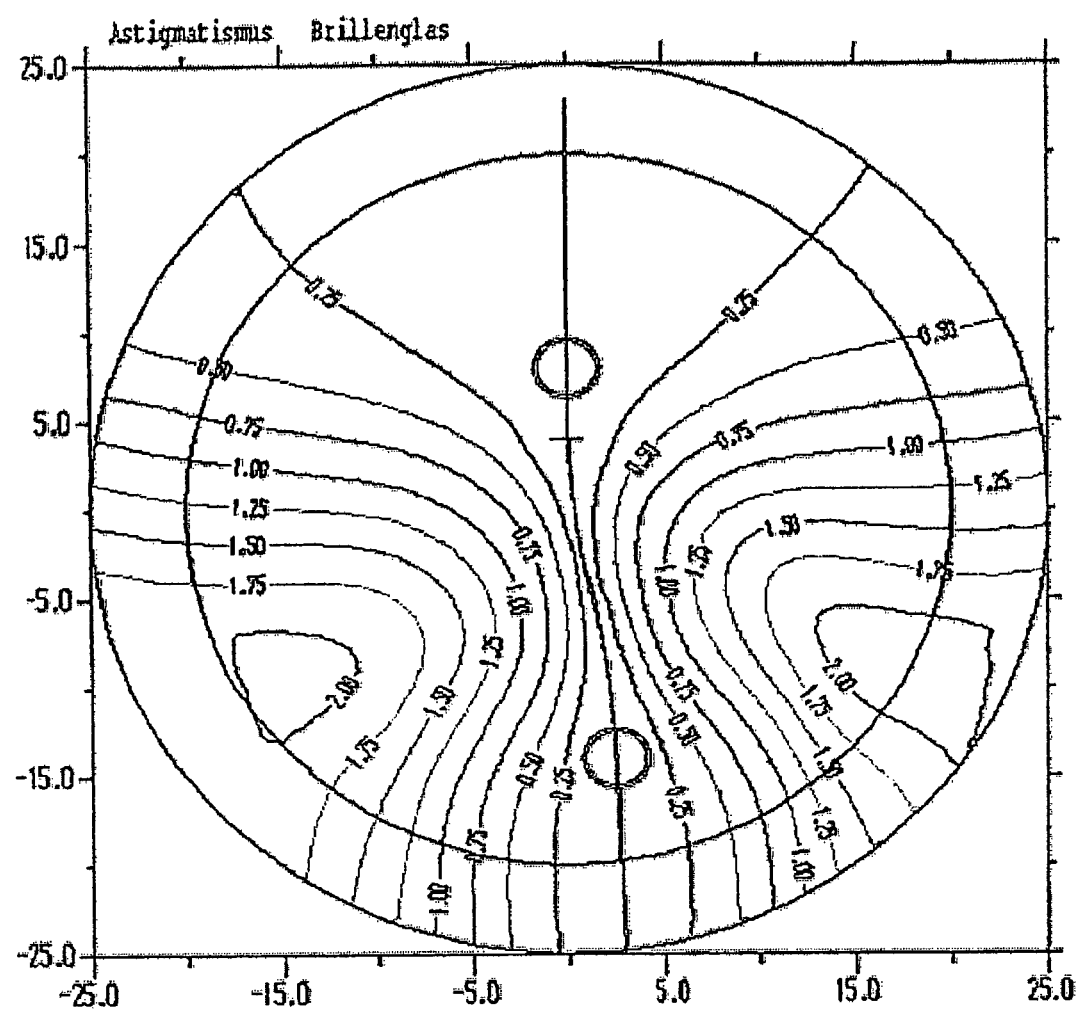

FIG 3a    Stand der Technik
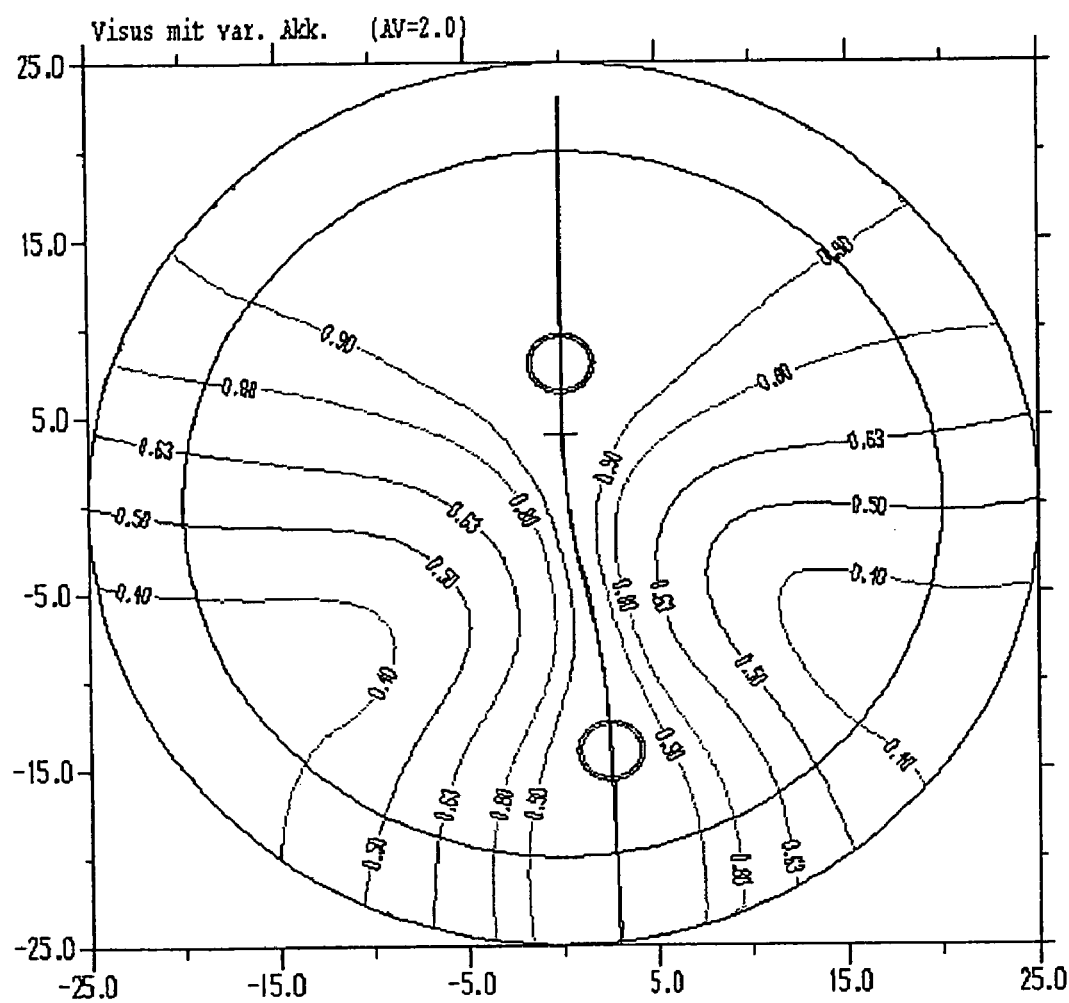

FIG 4a     Stand der Technik
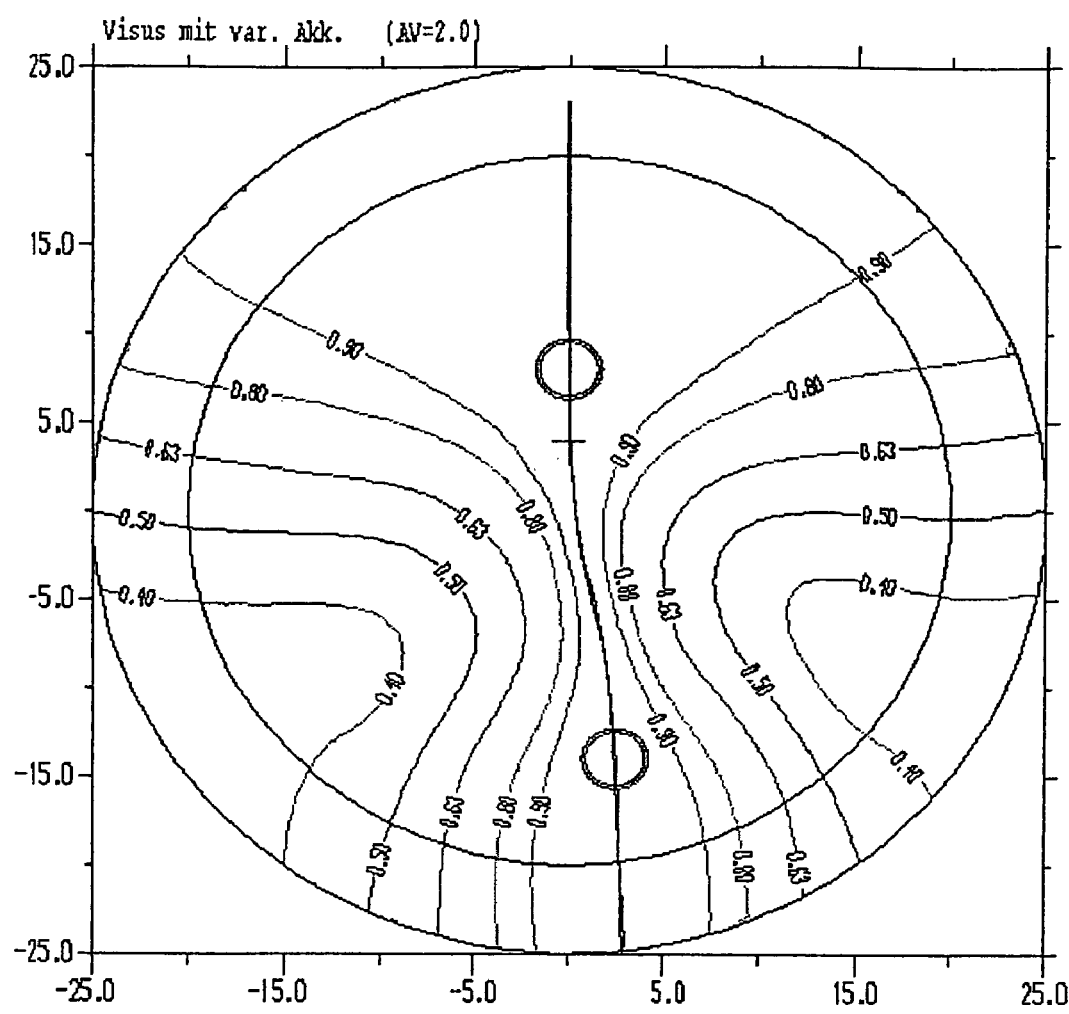

FIG 5a           Stand der Technik
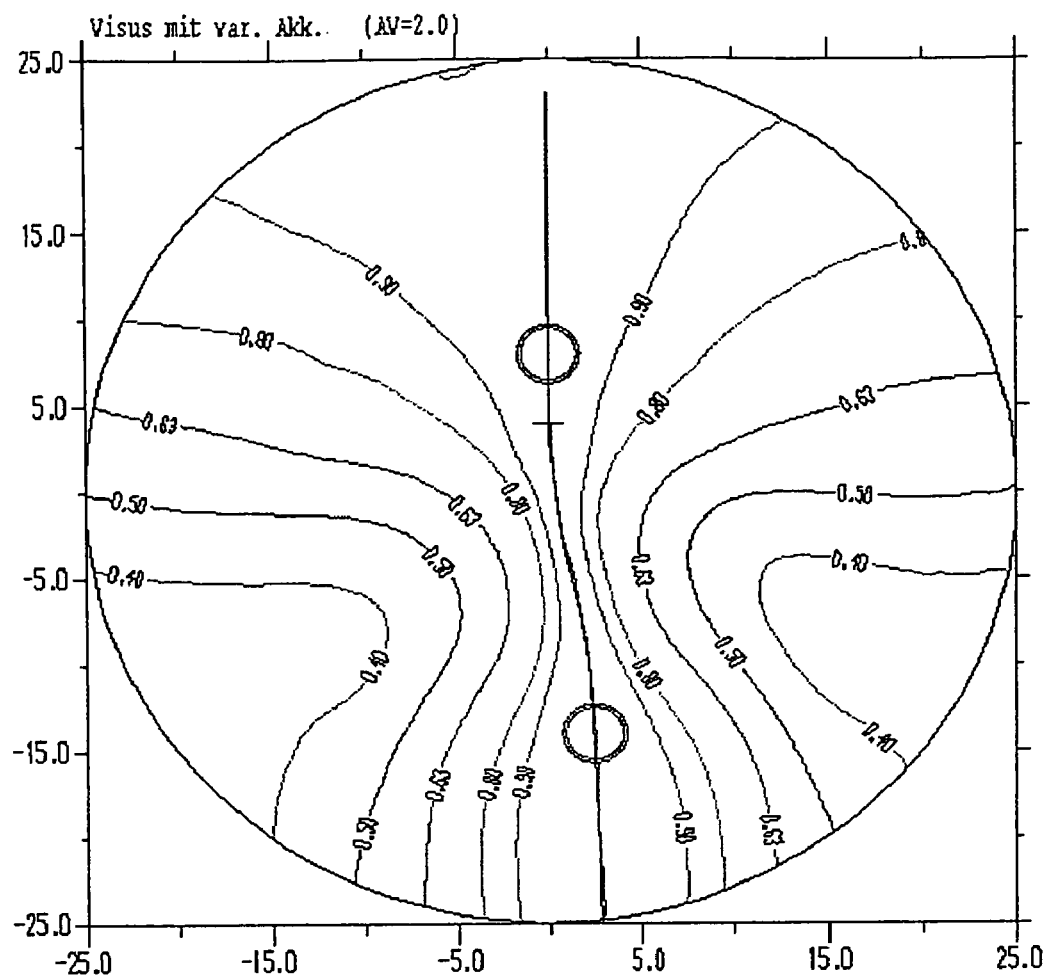

ERROR-TOLERANT PROGRESSIVE GLASS DESIGN

BACKGROUND AND SUMMARY OF THE INVENTION

The invention relates to a method of producing a progressive spectacle glass as well as to a corresponding progressive spectacle glass.

Progressive spectacle glasses are distinguished by the fact that they have an area for looking into the distance called a far focusing range and an area for seeing nearby called a near focusing range, these areas being connected with one another by a so-called progression zone. In the progression zone, the effect of the spectacle lens increases from the value of the far reference point $B_F$ to the value of the near reference point $B_N$ situated in the near area along a helical line which is called the main line. The effect difference between the far and the near reference point is called addition.

As a rule, the far focusing range is arranged in the upper area and the near focusing range is arranged in the lower area of the usage position of the spectacle lens. Such progressive spectacle glasses are well known in the state of the art. Only as an example, reference is made to International Patent Application WO 01/81981 of Rodenstock GmbH, München.

As a rule, such progressive eye glasses have, in addition to the initially mentioned far and near reference point, a prism reference point and a centering point. Concerning the terminology and definition, reference is made here to the above-mentioned International Patent Document WO 01/81981, in which the far, near and prism reference point and the centering point represent the generally customary names also used in EN Standard ISO 13666. In the far reference point $B_F$, the far focusing effect, that is, the spherical and/or cylindrical effect of the spectacle glass, is reached. In the near reference point $B_N$, the near effect, that is, the far effect plus the addition, is reached. In the prism reference point, the prismatic effect, that is, the prescribed prism and the thickness reduction prism, is reached.

The centering point $B_Z$ is used for centering the spectacle glass and thus represents that point which defines the local position of the spectacle glass with respect to the eye. As a rule, a progressive spectacle glass is centered in front of the eye such that, when the position of the head and body is normal, the spectacle glass, in the case of the so-called zero viewing direction (that is, when the viewing is horizontal), is positioned in front of the eye such that the centering point is situated in front of the pupillary center of the eye.

In patent literature, different terms are partly used for the same points. Thus, in European Patent Document EP 0 911 670 B1, the terms "reference point for the far vision, reference point for the near vision and mounting cross" are used. However, these terms have the same meaning.

As a rule and for the purposes of this application, the reference points have the following heights in vertical sectional views through the spectacle glass; that is, y-coordinates in a projection onto an xy-plane, Far reference point $B_F$ y=8 mm, centering point $B_Z$ y=4 mm, prism reference point y=0 and near reference point $B_N$ y=14 mm. In this case, the so-called horizontal line H of the glass is used as the zero point, the spatial position and direction of the horizontal line H usually being defined by permanent markings which are typically situated at a distance of 17 mm laterally of the main meridian. In the center between the permanent markings on the horizontal line of the glass, the glass center is situated, which in most cases (glasses not predecentered) is the geometrical center of the surface of the unframed glass. In this case, the glass center point coincides with the prism reference point.

Tests have shown that the main viewing direction as a rule deviates from the zero viewing direction, specifically by 5 to 10 degrees downward. This corresponds approximately to a y-coordinate of from 2 mm to -1 mm. Again, the main viewing task, as a rule, is in the distance.

It had therefore already been recognized in the International Patent Application WO 01/81981 of Rodenstock GmbH that it is advantageous for the refraction value to not start to rise directly below the far reference point $B_F$, as otherwise often customary, but only later. Thus, it becomes possible by means of this known spectacle glass to still see into the distance also in the main viewing direction, under certain circumstances, while utilizing the depth of focus. In the case of other conventional progressive spectacle glasses, such as in the embodiments of European Patent Document EP 0 911, 670, this is as a rule no longer possible. In the case of the above-mentioned patent document (compare FIGS. 6 and 9), a fogginess of 0.3 dpt already exists in the main viewing direction, which can be compensated only under the best light conditions and contrast by the depth of focus (approximately +/−0.3 dpt).

Fortunately, the human eye only has a small aperture which varies between 2 and 7 mm. However, since the human eye itself has greater errors of a higher order, the human visual system has also superimposed a "sensory aperture" on the physical aperture. This phenomenon, which is known as the Stiles-Crawford effect, is caused in that the cones—like optical waveguides—are oriented to the pupillary center and are therefore clearly more sensitive to rays coming from there. This results in an effective opening of the pupil of only 2 to 5 mm.

It is an object of the invention to indicate a method of producing a progressive spectacle glass which, while taking into account the typical ordering and production sequence, regularly results in a progressive spectacle glass which has improved optical imaging characteristics for the ordering customer and is particularly less sensitive with respect to refraction errors, particularly positive refraction errors.

This object is achieved by of a method which comprises the following steps:

defining an ordering value for the average use value in the far reference points $B_F$ of the progressive spectacle glass;

calculating the progressive spectacle glass while taking into account a calculation value of the average use value in the far reference point $B_F$, the calculation value having a negative desired refraction deviation between 0.03 DPT and 0.2 dpt in comparison to the ordering value in the far reference point $B_F$; and producing the calculated progressive spectacle glass.

The negative desired refraction deviation is preferably between 0.08 dpt and 0.12 dpt. In the case of the method according to the invention for producing a progressive spectacle glass, the calculation of the progressive spectacle glass is therefore not based on the ordering value of the average use value in the far reference point $B_F$, but on a so-called calculation value which, with respect to the ordering value, has a negative desired fraction deviation. In other words, the calculation and optimization of the progressive spectacle glass does not start with the ordering value of the average use value in the far reference point $B_F$ prescribed for the wearer of the spectacles but a calculation value which deviates therefrom and which is reduced by a predetermined desired refraction deviation with respect to the ordering value. The calculation and optimization step therefore takes place on the basis of an average use value in the far reference point $B_F$ which does not correspond to the prescribed median use value.

However, surprisingly, this introduction of a negative desired refraction error in the far reference point $B_F$ in the calculation step regularly results in a progressive spectacle glass which has better optical imaging characteristics for the wearer of the spectacles while taking into account the typical ordering and production process. The obtained progressive spectacle glass according to the invention proves to be less sensitive to small refraction errors, particularly positive refraction deviations.

The average use value D, in the sense of this invention, is the average value of the reciprocal values of the image-side distances S'1 and S'2 (between the back lens and the image minus the object distance, thus the object-side distance S, wherein the following applies:

$$D = \frac{S1\_ + S2}{2} - S$$

In other words, according to the production method of the invention, the calculation value on which the calculation or optimization is based is reduced with respect to the ordering value of the refractive power in the use position in the far reference point $B_F$ of the progressive spectacle glass by a predetermined negative desired refraction deviation between 0.03 dpt and 0.2 dpt. Thus, the calculation or optimization step is based on a calculation value of the average use value which nominally for the ordering wearer of the spectacles has a negative desired refraction error of a predetermined amount. The refraction value distribution, on which the calculation and optimization step is based, may, for example, be as in International Patent Document WO 01/81981.

According to a preferred embodiment of the method according to the invention, the step of calculating the progressive lens or spectacle glass takes place by taking into account a calculation addition which is increased at least by the amount of the negative desired refraction deviation in the far reference point in comparison with the ordering addition. Thus, the average use value (or the refraction value in the use position) in the near reference point $B_N$, on which the calculation and optimization step is based, is, for example, equal to the prescribed or ordered average use value in the near reference point $B_N$. For this purpose, the calculation addition on which the calculation step is based is increased by that amount by which the effect in the far reference point was nominally reduced.

According to a particularly preferred embodiment of the method according to the invention, the calculation addition is increased with respect to the ordering addition by the sum of the amount of the negative desired refraction deviation in the far reference point $B_F$ and of a positive desired refraction deviation between 0.02 dpt to 0.1 dpt, preferably 0.05 dpt.

Thus, the calculation step of the progressive spectacle glass takes place on the basis of (calculation) refraction values in the use position, which differ in the far reference point as well as in the near reference point from the prescribed (ordering) values. Thus, with respect to the ordering values in the far reference point, there is nominally a negative refraction deviation and, in the near reference point, there is nominally a positive refraction deviation.

The recognitions and motives on which the introduction of desired refraction deviations in the calculation step according to the invention are based, will be explained in detail below.

Preferably, the step of calculating the progressive spectacle glass or lens while taking into account a predetermined desired refraction error takes place on the main line as a function of the y-coordinate along the vertical section of the spectacle glass. Thus, according to this particularly preferred embodiment, the calculation of the progressive spectacle glass takes place while considering a predetermined desired refraction error along the main line or of the main meridian of the spectacle glass, the desired refraction error being a function of y (that is, of the vertical axis). In this case, the predetermined desired refraction error is preferably set such that, in the far reference point, for the calculation value of the average use value, a negative desired refraction deviation is obtained with respect to the corresponding ordering value and, in the near reference point, a positive desired refraction deviation of the calculation value is obtained with respect to the corresponding ordering value. Particularly preferably, in the case of such a calculation or optimization, a so-called double asymptotic function for the desired refraction error is used as a function of y of the form:

$$f(y) = b + a\frac{a}{1 + 3^{c(y+d)m}} + \sum_i g_i y^i$$

wherein a, b, c, d, m and $g_1$ are constants. The constants may, for example, assume the value a=0.125 dpt, b=−0.125 dpt, c=−0.5 dpt, d=1 mm, m=1.3, i=0. Likewise, it is conceivable to use cubical or higher-grade spline functions or other suitable functions.

The step of calculating the progressive spectacle glass preferably takes place such that the average use value of the produced spectacle glass increases as little as possible in the case of a horizontal viewing deflection in the far range. The average use value of the produced spectacle glass at the height of the far reference point in the case of a horizontal viewing deflection preferably increases by less than 0.25 dpt, preferably by less than 0.15 dpt, in comparison to the average use value in the far reference point. In particular, the calculation step can be implemented such that, when an (additional) refraction error of +0.2 dpt is superimposed (for example, because of manufacturing fluctuations), the far range is reduced by not more than 5%, preferably by not more than 3%.

According to another aspect of the invention, a progressive spectacle glass is suggested which has a far vision part with a far reference point, a near vision part and a progression zone, the progressive spectacle glass being designed such that its calculation takes place while taking into account a calculation value of the average use value in the far reference point, the calculation value having a negative desired refraction deviation of between 0.03 dpt and 0.2 dpt with respect to a predefined ordering value of the average use value in the far reference point.

The negative refraction deviation is preferably between 0.08 dpt and 0.12 dpt. The progressive spectacle glass is preferably designed such that its calculation takes place while taking into account a calculation addition which is increased at least by the amount of the negative desired refraction deviation in the far reference point in comparison to the ordering addition.

The calculation addition is preferably increased with respect to the ordering addition by the sum of the amount of the negative desired refraction deviation in the far reference point and of a positive desired refraction deviation between 0.02 dpt to 0.1 dpt.

According to another aspect of the invention, a progressive spectacle glass is suggested which has a far vision part, a near vision part and a progression zone, the progressive spectacle glass being designed such that, when a refraction error of +0.2 dpt is superimposed, the far range is reduced by not more than 5%, preferably by not more than 3%.

Other objects, advantages and novel features of the present invention will become apparent from the following detailed description of the invention when considered in conjunction with the accompanying drawings.

BRIEF DESCRIPTION OF THE DRAWINGS

FIG. 1a is a view of the refraction value distribution of a conventional progressive spectacle glass.

FIG. 2a is a view of the astigmatism distribution of the conventional progressive spectacle glass.

FIG. 3a is a similar distribution view of the preferred progressive spectacle lens according to the invention.

FIG. 4a is a view of the distribution of the relative reduction of the visual acuity as a result of the imaging errors of the conventional progressive spectacle glass.

FIG. 5a is a view of the distribution of the relative reduction of the visual acuity as a result of the imaging errors of the conventional spectacle lens.

DETAILED DESCRIPTION OF THE DRAWINGS

Figure 1B:
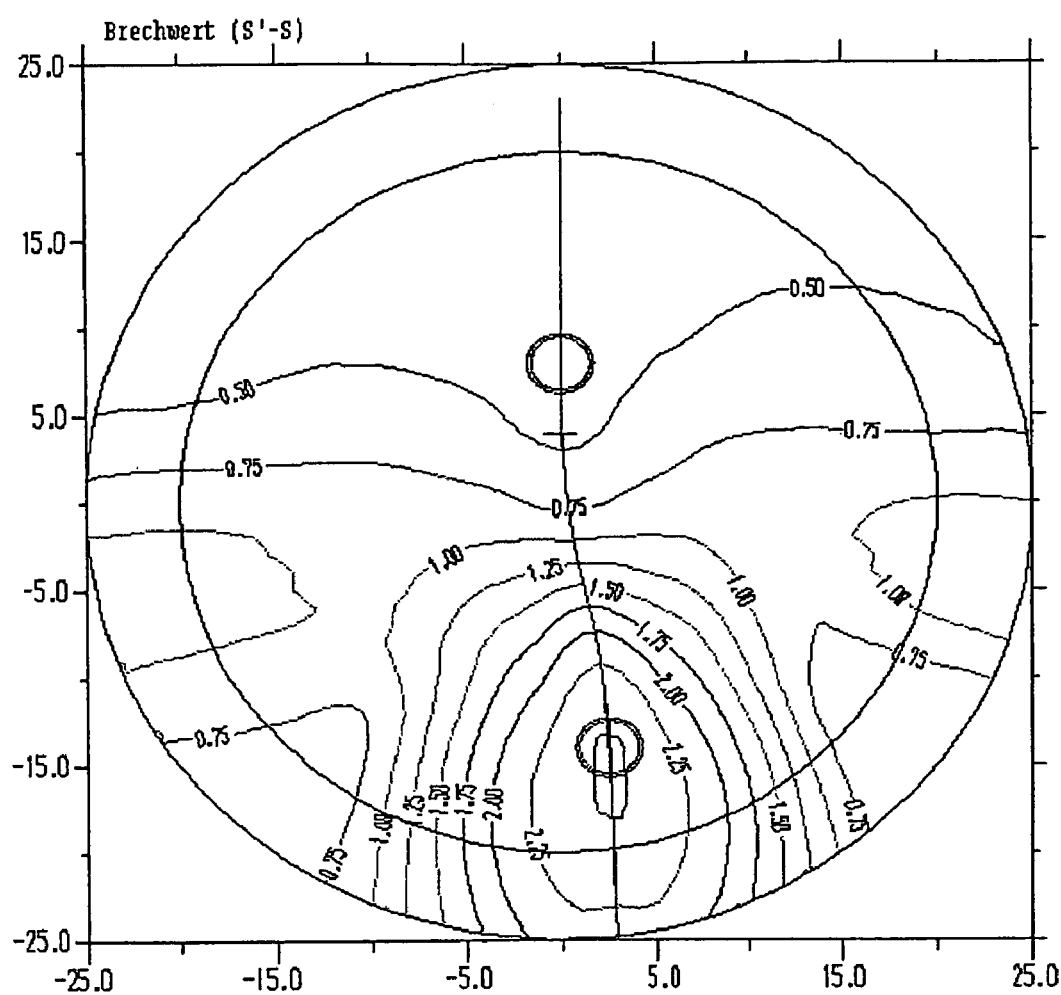
FIG. 1b is a similar distribution view but of a preferred lens produced according to the invention, each in the use position.

According to the above-illustrated preferred embodiment according to the invention for producing a progressive spectacle glass or lens, the calculation and optimization step of the progressive spectacle glass takes place on the basis of calculation values for the average use value in the far reference point and the near reference point which each differ in a targeted manner from the corresponding ordering values or prescribed values. Thus, according to a preferred method according to the invention, the calculation value for the refraction value in the use position in the far reference point is reduced by a predetermined negative desired refraction deviation with respect to the corresponding ordering value, and the calculation addition on which the calculation is based is increased by at least the same amount with respect to the prescribed addition (ordering addition). Preferably, the calculation addition is even increased such with respect to the ordering addition that the calculation of the progressive spectacle glass is based on a positive desired refraction deviation of the refraction value in the use position in the near reference point in comparison to the corresponding ordering refraction value.

Although the calculation and optimization of the progressive spectacle glass therefore takes place on the basis of calculation values of the average use value in the far and near reference point, which differ from the prescribed ordering values, according to this preferred method of to the invention, a progressive spectacle glass is surprisingly obtained which regularly has improved optical characteristics for the wearer of the spectacles and particularly a lower sensitivity with respect to small additional refraction deviations.

In the following, some of the essential recognitions and motives will be discussed on which this invention is based.

On the one hand, the invention is based on the recognition, which is known per se, that, in the use position (or the average use value) of a progressive spectacle glass depends on the opening of the pupil of the seeing eye. This basic relationship is illustrated in the manner of examples in Tables 1 to 3.

Table 1 shows the refraction value in the use position in the far reference point $B_F$, the centering point $B_Z$ and the near reference point $B_N$ for the addition Add 1.0, 2.0 and 3.0 dpt and the spherical effects Sph −4.0, −1.0, 2.0 and 5.0 dpt with an infinitesimal opening of the pupil for a conventional progressive spectacle glass. Here, the spherical effect Sph in the lines of the table and the additions Add in the columns of the table are constant. Table 2 shows the refraction value in the use position in the indicated reference points for the additions Add 1.0, 2.0 and 3.0 dpt and the spherical effects Sph −1.0 and 2.0 dpt in the case of a pupil opening of 3.5 mm. Table 3 finally shows the refraction value in the use position in the mentioned reference points for the additions 1.0, 2.0 and 3.0 and the spherical effects −4.0, −1.0, 2.0 and 5.0 with a pupil opening of 6 mm.

TABLE 1

| Add/ | 1.0 | | | 2.0 | | | 3.0 | | |
|---|---|---|---|---|---|---|---|---|---|
| Sph | BF | BZ | BN | BF | BZ | BN | BF | BZ | BN |
| −4 | −4.01 | −4.01 | −3.00 | −4.01 | −3.96 | −2.01 | −4.0 | −3.93 | −1.10 |
| −1 | −1 | −1 | −0.01 | −1.02 | 0.97 | 0.99 | −1.01 | −3.93 | −1.01 |
| 2 | 1.99 | 2.0 | 2.99 | 1.99 | 2.04 | 3.99 | 2.0 | 2.08 | 4.99 |
| 5 | 4.98 | 4.99 | 6.0 | 4.99 | 5.04 | 6.99 | 5.0 | 5.08 | 7.99 |

TABLE 2

| Add/ | 1.0 | | | 2.0 | | | 3.0 | | |
|---|---|---|---|---|---|---|---|---|---|
| Sph | BF | BZ | BN | BF | BZ | BN | BF | BZ | BN |
| −1 | −1.0 | −0.99 | −0.02 | −1.0 | −0.94 | 0.96 | −0.98 | −0.88 | 1.93 |
| 2 | 2.0 | 2.01 | 2.97 | 2.0 | 2.08 | 3.95 | 2.02 | 2.13 | 4.93 |

TABLE 3

| Add/ | 1.0 | | | 2.0 | | | 3.0 | | |
|---|---|---|---|---|---|---|---|---|---|
| Sph | BF | BZ | BN | BF | BZ | BN | BF | BZ | BN |
| −4 | −4.01 | −4.01 | −3.04 | −3.99 | −3.91 | −2.11 | −3.97 | −3.85 | −1.15 |
| −1 | −0.99 | −0.98 | −0.04 | −0.98 | −0.9 | 0.92 | −0.95 | −0.82 | 1.86 |
| 2 | 2.01 | 2.02 | 2.95 | 2.03 | 2.14 | 3.88 | 2.07 | 2.21 | 4.82 |
| 5 | 5.0 | 5.03 | 5.91 | 5.03 | 5.17 | 6.84 | 5.08 | 5.26 | 7.75 |

Figure 7:
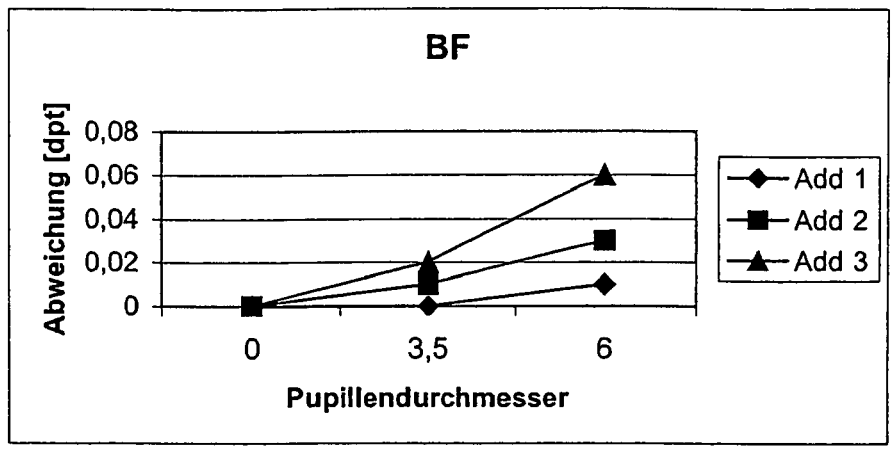
FIG. 7 is a graph of the deviation of the refraction value in the use position as a function of the pupil diameter for the effect Sph=−1.0 dpt and the additions 1, 2 and 3 dpt in the far reference point.
Figure 8:
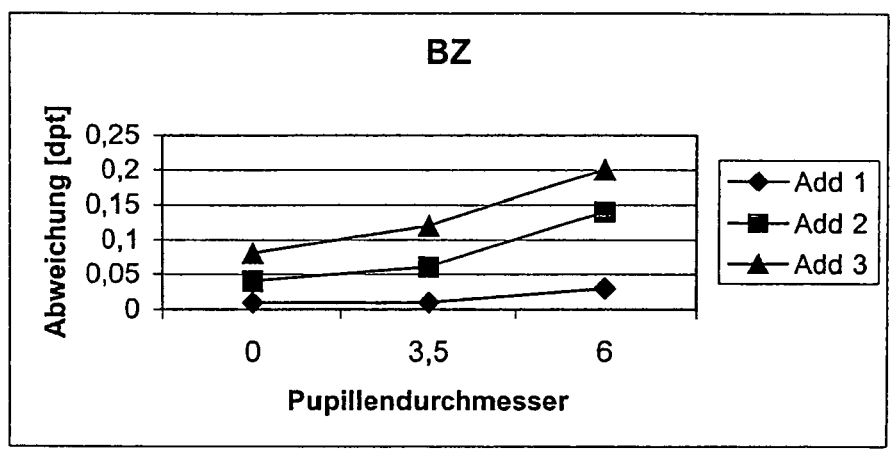
FIG. 8 is a graph of the deviation of the refraction value in the use position as a function of the pupil diameter for the effect Sph=−1.0 dpt and the additions 1, 2 and 3 dpt in the centering point.
Figure 9:
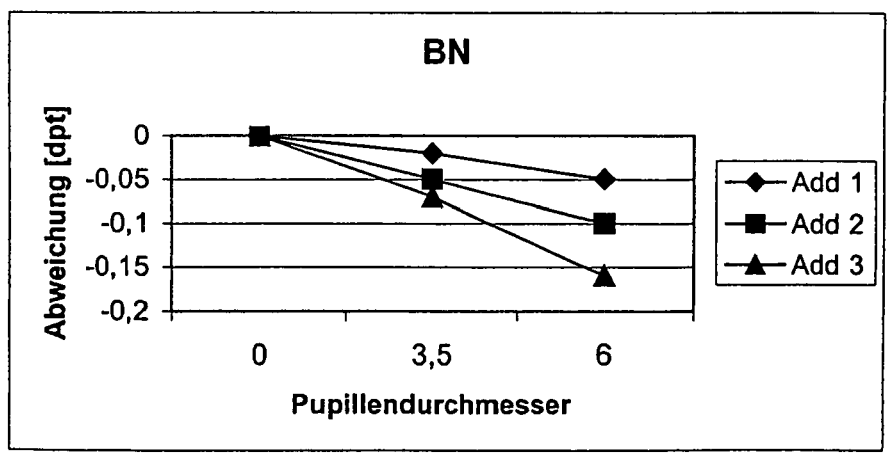
FIG. 9 is a graph of the deviation of the refraction value in the use position as a function of the pupil diameter for the effect Sph=−1.0 dpt and the additions 1, 2 and 3 dpt in the near reference point.

The corresponding relationship is again shown graphically in FIGS. 7 to 12 which illustrate the deviation of the refraction value in the use position as a function of the diameter of the pupil of the seeing eye for different additions in the respectively indicated reference points with the given spherical effect. In FIGS. 7 to 9, the spherical effect amounts to −1.0 dpt and the indicated additions Add—as illustrated in the respective insets—amount to −1, 2 and 3 dpt.

Figure 10:
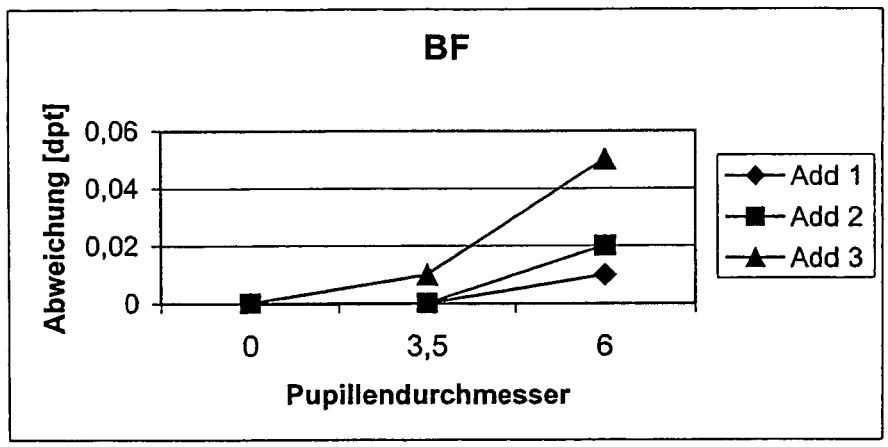
FIG. 10 is a graph of the deviation of the refraction value in the use position as a function of the pupil diameter for the effect Sph=+2.0 dpt and the additions 1, 2 and 3 dpt in the far reference point.
Figure 11:
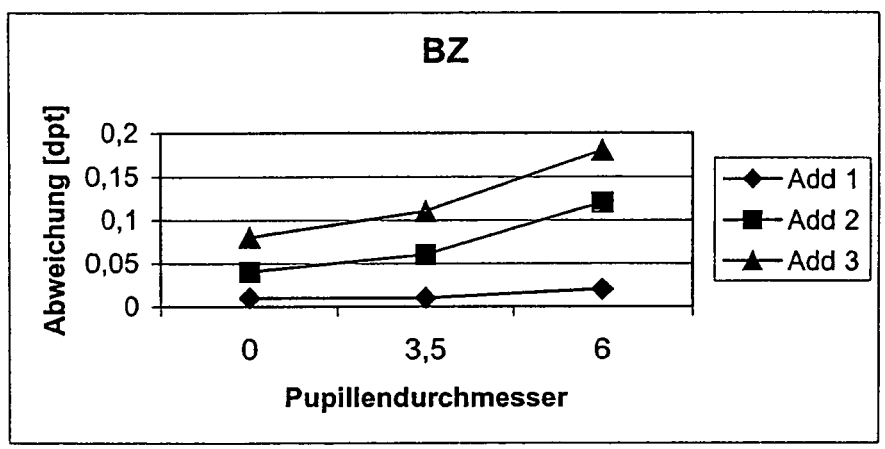
FIG. 11 is a graph of the deviation of the refraction value in the use position as a function of the pupil diameter for the effect Sph=+2.0 dpt and the additions 1, 2 and 3 dpt in the centering point.
Figure 12:
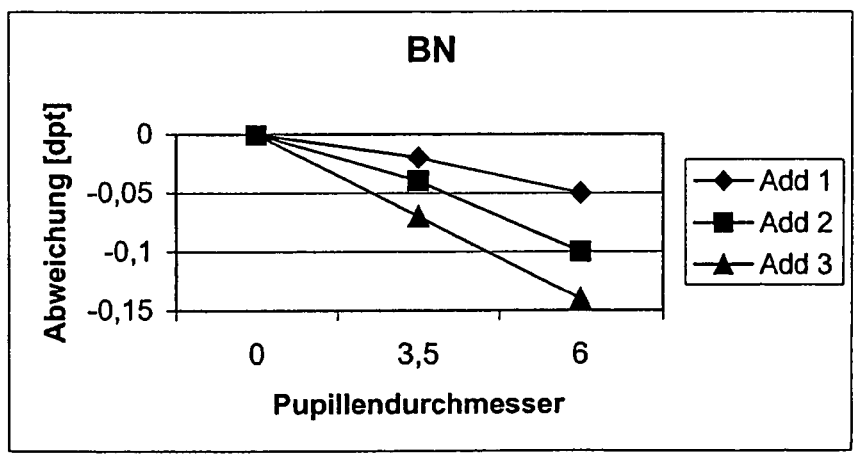
FIG. 12 is a graph of the deviation of the refraction value in the use position as a function of the pupil diameter for the effect Sph=+2.0 dpt and the additions 1, 2 and 3 dpt in the near reference point.

FIG. 7 shows the dependence of the deviation of the refraction value in the use position on the pupil diameter in the far reference point $B_F$; FIG. 8 shows this in the centering point $B_Z$; and FIG. 9 in the near reference point $B_N$. FIGS. 10 to 12 correspond to the respective FIGS. 7 to 9 in all corresponding values, with the exception of the spherical effect, which in each case amounts to +2.0 dpt in FIGS. 10 to 12.

Tables 1 to 3 as well as FIGS. 7 to 12 show that, in the case of progressive spectacle glasses, the refraction value in the use position increases with the enlargement of the pupil opening in the far reference point as well as in the centering point, while it diminishes in the near reference point. While at small pupil diameters, that is, under optimal light and contrast conditions, the deviation of the fraction values in the use position is very small, when the pupils are open (pupil diameter=6 mm), considerable deviations of the refraction values are exhibited. Because of the dependence of the average use value on the diameter of the pupil, in the case of large diameters of the pupil, these deviations have the effect that the refraction value in the use position has a positive refraction error in the far and centering point and a negative refraction error in the near reference point.

However, in the case of a refraction value distribution of conventional progressive spectacle glasses, the occurrence of such a positive or negative refraction error leads to serious problems which impair the optical imaging characteristics. Even in the case of modern progressive spectacle glasses, which were constructed according to the teaching of International Patent Document WO 01/91981 and German Patent Document DE 102 50 093.2, because of the dependence of the refraction value in the use position on the diameter of the pupil, such refraction errors result in problems in the main see-through point, which is at heights y=−1 to +2 mm. Such lacks of optical imaging quality occur particularly when the light conditions and the contrast are poor and result in a large opening of the pupil.

According to a particularly preferred embodiment of the production process according to the invention, the invention counteracts such a negative influence in that, in the calculation process of the progressive spectacle glass, a negative desired refraction deviation is introduced in the far reference point and a positive desired refraction deviation is introduced in the near reference point. Such a desired refraction deviation introduced in a targeted manner has the result that a correspondingly produced progressive spectacle glass has significantly improved optical imaging characteristics for the wearer of the spectacles also in the case of large openings of the pupil.

The invention is also based on the recognition that positive refraction errors (fogginess) have a far more critical effect on the optical imaging characteristics than negative refraction errors. The cause is that positive errors can be compensated only by the depth of focus. However, the depth of focus decreases considerably with the increase of the opening of the pupil.

In contrast, negative deviations, in addition to the depth of focus, can additionally be compensated by the accommodation. However, the latter diminishes with the spectacle wearer's age and is also the reason why a progressive spectacle glass is necessary. It is a rule of thumb that the residual accommodation capacity amounts to approximately 3 dpt minus the addition, so that up to an addition of 3 dpt, sufficient accommodation capacity will still exist in order to compensate small negative refraction errors. Furthermore, the wearer of the progressive spectacle glass is able to compensate small negative errors by lowering his view and the refraction value increase connected therewith. This is not possible in the case of positive refraction errors.

Furthermore, the invention applies the recognition that positive errors are not only more critical but also occur more frequently. The cause is particularly the refraction determination for determining the prescription or ordering values. As a rule, the refraction determination is carried out in a room with a vision test distance of from 5 to 6 m. Because of the fact that the vision test is not in infinity but at a finite distance, a positive refraction occurs of approximately 0.15 to 0.2 dpt. Although a complete refraction determination contains the examination with respect to infinity, often or as a rule, this is not carried out and this error therefore remains.

Since the refraction can be precisely determined only to +/−0.12 dpt, there is an uncertainty of approximately −0.1 to +0.25 dpt.

Finally, manufacturing deviations during the production of the progressive spectacle glass, which are superimposed on the preceding errors, are unavoidable. In the far range, these also have the tendency to go in the direction of positive reaction errors.

By means of the described embodiment of a manufacturing method according to the invention, a progressive spectacle glass can be produced which nominally in the far reference point has a negative refraction error and in the near reference point has a positive reaction error. This, on the one hand, takes into account the refraction value increase and decrease when the opening of the pupil is enlarged and, on the other hand, the design becomes less sensitive to small refraction deviations.

Furthermore, it is naturally conceivable to control the refraction value distribution in the periphery of the spectacle glass such that the refraction value increases only slightly in the distance in the case of lateral viewing deflections. Thus, fogginess during lateral viewing deflections does not occur so rapidly.

In the following, a progressive spectacle glass produced according to a preferred manufacturing process according to the invention is described as an example in comparison to a corresponding conventional spectacle glass.

Figure 2B:
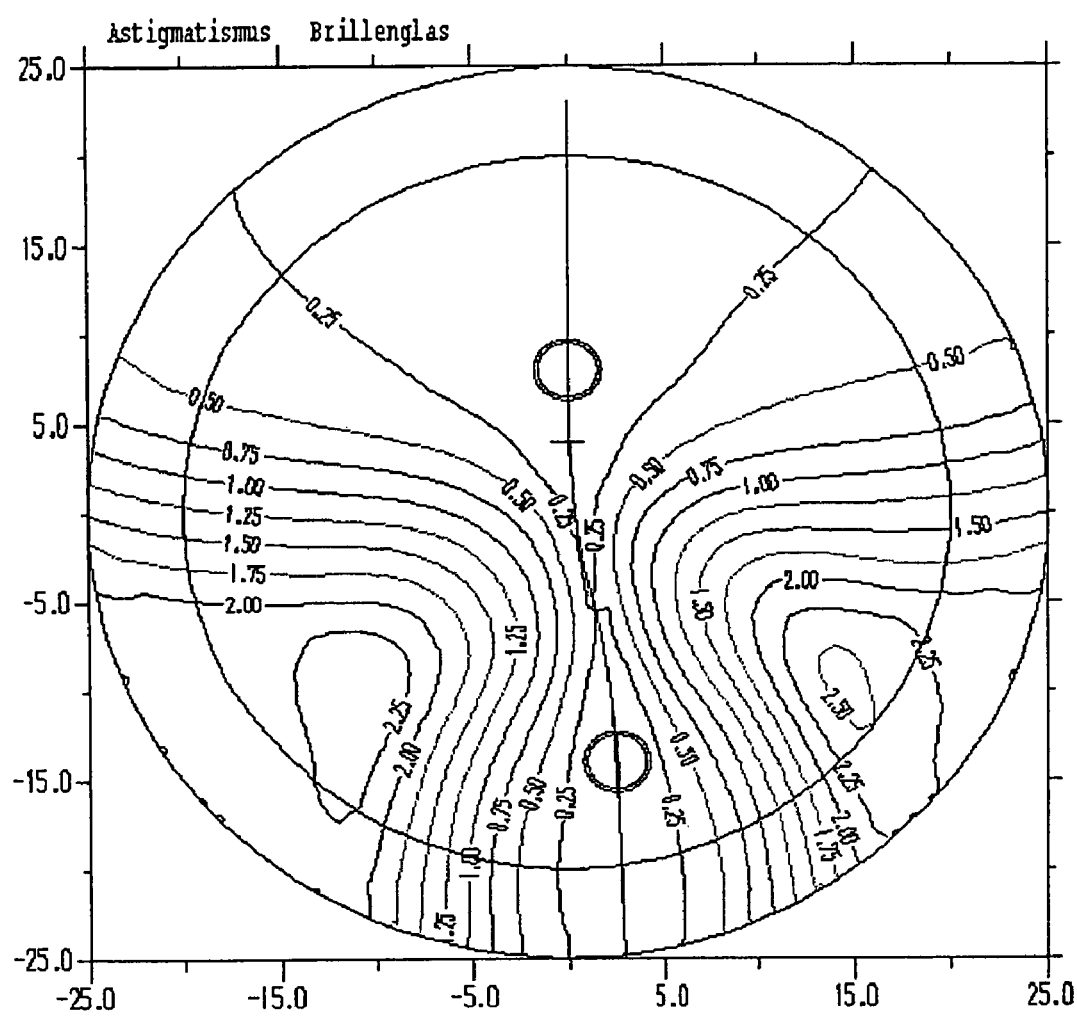
FIG. 2b is a similar distribution view but of the preferred spectacle lens produced according to the invention of the spectacle lens also illustrated in FIGS. 1a and 1b, each in the use position.

FIG. 1a shows the refraction value distribution, and FIG. 2a shows the astigmatism distribution of a conventional progressive spectacle glass or lens in each case in the use position. The spectacle glass is a progressive spectacle glass of Rodenstock GmbH, which is sold under the tradename Multigressiv ILT. FIGS. 1b and 2b correspondingly show a preferred spectacle glass or lens according to the invention with a changed refraction value distribution and superimposed negative and positive desired refraction errors in the reference points.

In the case of the preferred spectacle glass according to the invention, a negative desired refraction deviation of 0.1 dpt was introduced into the far reference point which in FIG. 1b is outlined by an upper circle on the helical main line. Simultaneously the calculation addition was increased by 0.1 dpt with respect to the ordering addition. The near reference point is characterized by a lower circle on the main line. The conventional spectacle lens as well as the spectacle lens according to the invention have a spherical (ordering) far effect of 0.50 dpt and an (ordering) addition of 2.00 dpt.

FIG. 1b illustrates that the refraction value in the far reference point is smaller in comparison to the conventional spectacle glass according to FIG. 1a. As illustrated in FIG. 2b, the slightly higher addition in the case of the invention causes a slightly narrower progression range in comparison to the conventional spectacle glass according to FIG. 1a. This disadvantage cannot be prevented.

Figure 3B:
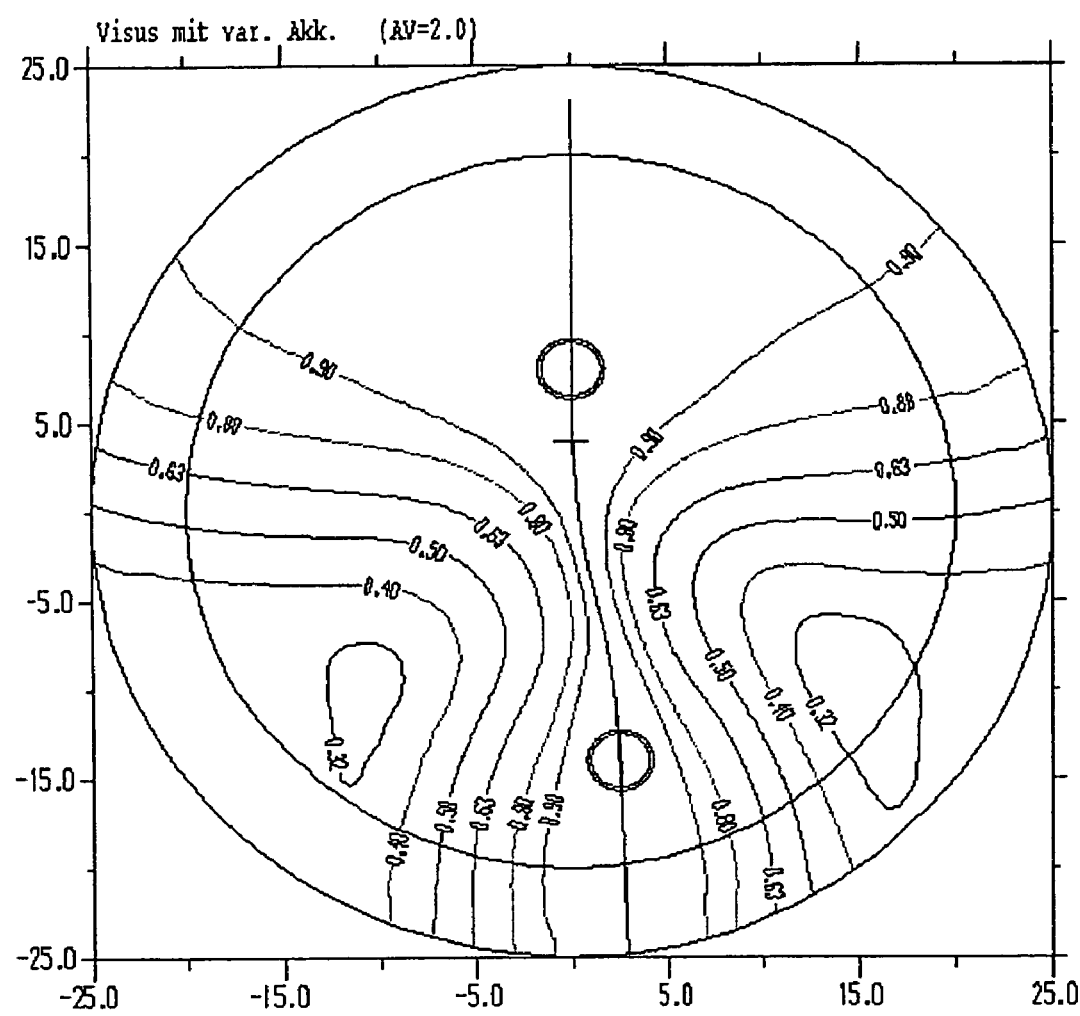
FIG. 3a is a view of the distribution of the relative reduction of the visual acuity as a result of the imaging errors (astigmatic deviation and refractive deviation) of the conventional progressive spectacle lens.

FIGS. 3a (conventional spectacle glass) and 3b (preferred spectacle glass according to the invention) each show the distribution of the relative reduction of the visual acuity as a result of imaging errors (astigmatic deviation and refraction deviation) of the progressive spectacle glasses illustrated in FIGS. 1a and 1b, respectively and FIGS. 2a and 2b, respectively. The relative reduction of the visual acuity of a wearer of the spectacles indicates how much the spectacle wearer's visual acuity is reduced by the imaging errors (astigmatic error and refraction error) of the spectacle glass. The isoline in FIGS. 3a to 5b with, for example, 0.9 means that the visual acuity is reduced to 90% of the spectacle wearer's initial sight. If, for example, a spectacle wearer with a fully corrected spectacle glass has a visual acuity (sight) of 1.6, his sight when looking through the spectacle glass at a point at which the visual acuity reduction amounts to 0.9, will only still be 0.9*1.6, that is, 1.44. Likewise, if his initial sight amounts to 1.25, 1.25*0.9=1.125, or in the case of an initial sight of 2.0 and a visual acuity reduction of 0.5, it will only be 0.5*2.0=1.0. Reference is made in this case to the article by Professor Dr. E. Hartmann, "Consequences of Small Faulty Refractions", Der Augenoptiker, November 1988, Pages 20 to 24. In FIGS. 3a and 3b, an optimal correction was assumed in each case; that is, no additional superimposed correction error occurs.

Figure 4B:
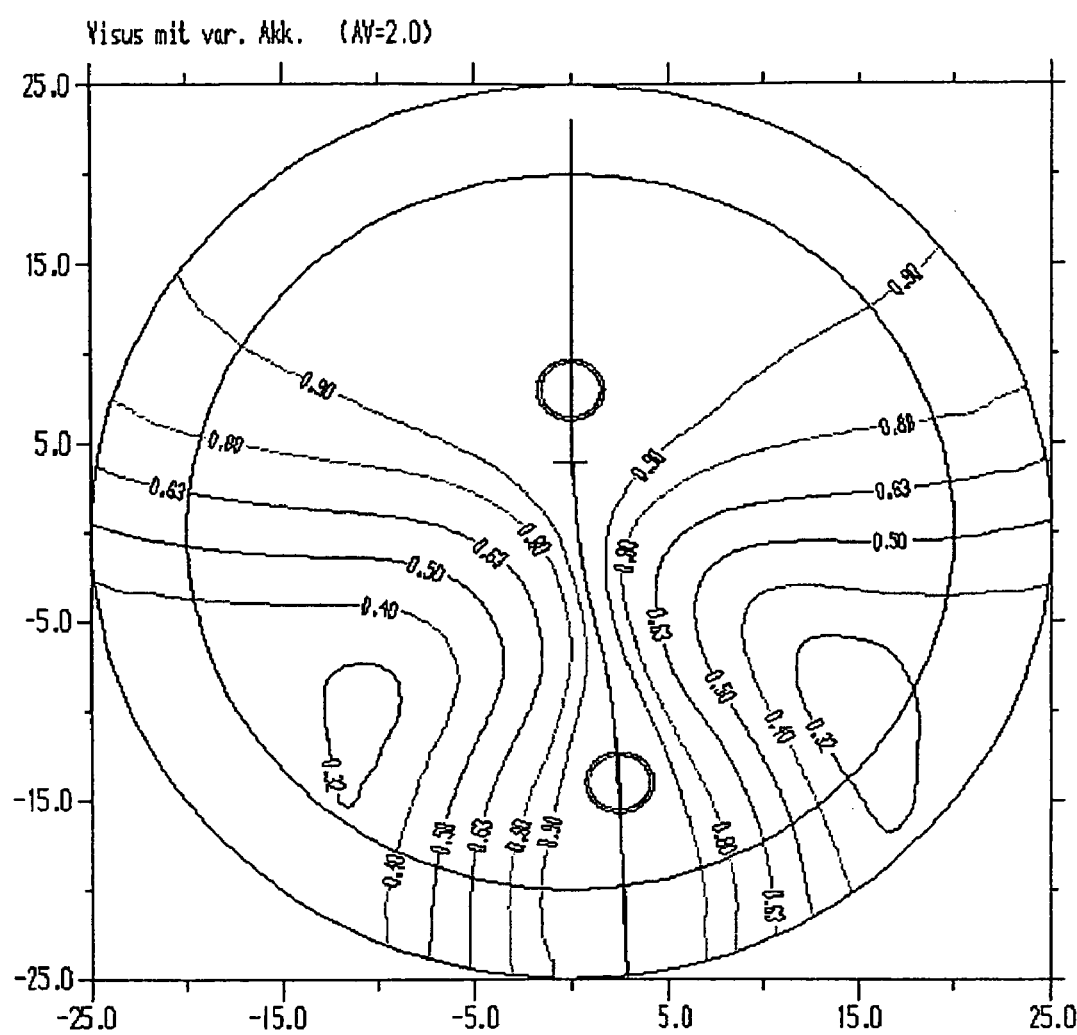
FIG. 4b is a similar distribution view of the preferred progressive spectacle glass according to the invention when an additional refraction error of −0.2 dpt occurs.

FIGS. 4a and 4b each show the distribution of the relative reduction of visual acuity when an additional negative refraction error of −0.2 dpt occurs in the case of the progressive spectacle glass illustrated in FIGS. 3a and 3b. Virtually no differences can be seen with respect to the optimal correction according to FIGS. 3a and 3b. Because of the existing residual accommodation capacity, these errors can be compensated.

Figure 5B:
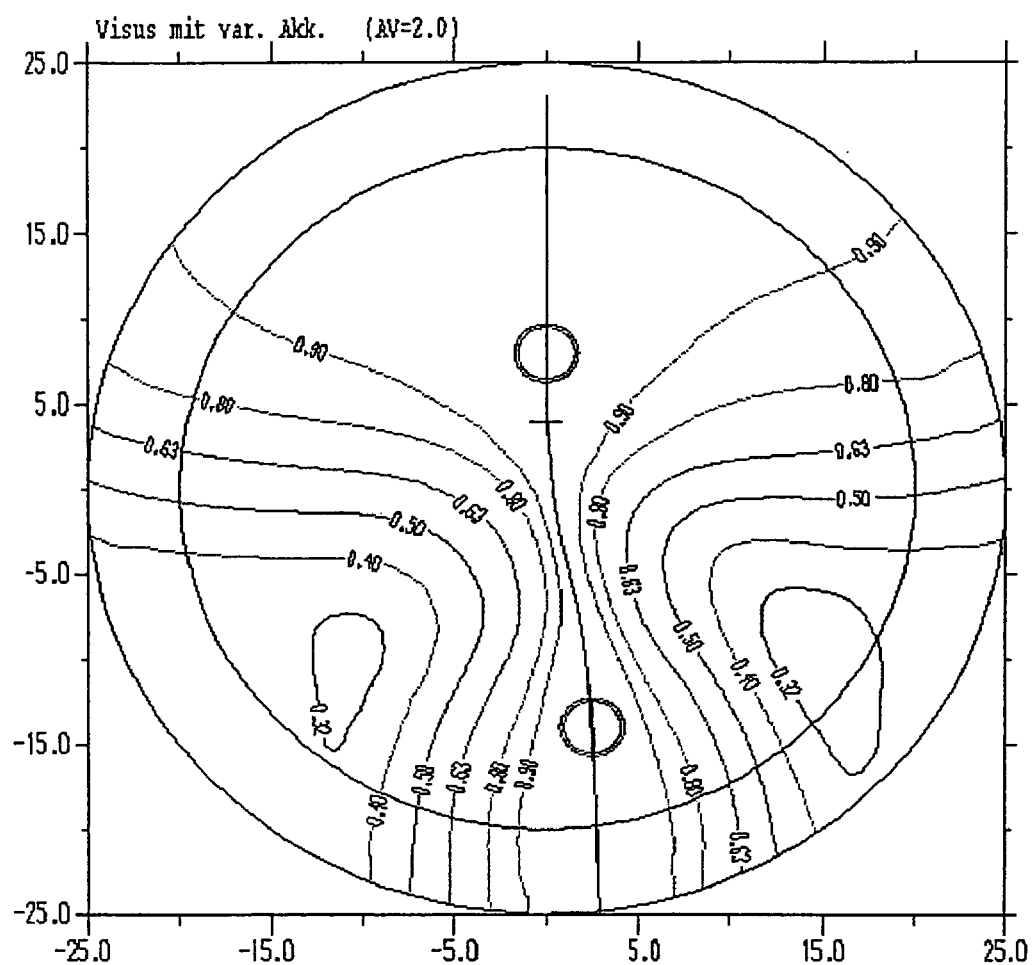
FIG. 5b is a similar distribution view of the preferred progressive spectacle lens according to the invention when an additional refraction error of +0.2 dpt occurs.

FIGS. 5a and 5b each show the distribution of the relative reduction of the visual acuity when an additional positive refraction error of +0.2 dpt occurs in the case of the progressive spectacle glasses illustrated in FIGS. 3a and 3b. FIG. 5b shows the insensitivity of the spectacle glass according to the invention with respect to small positive refraction errors. While, in the case of the conventional spectacle glass of FIG. 5a, the far range is clearly reduced, it remains almost unchanged in the case of the spectacle glass according to the invention. In this case, the far range is defined as the range within a semicircle with a radius of 20 mm about a point which is situated 4 mm below the centering point (illustrated by a cross in FIGS. 5a and 5b), and above a horizontal line which extends through this point and whose relative visual acuity amounts to more than 0.9 dpt.

The superimposition of predetermined desired refraction deviations is naturally possible only to a limited extent. Thus, FIGS. 2a, 2b, 3a and 3b already show that the progression range becomes slightly smaller as a result of the addition increase. Furthermore, care should naturally be taken that, with respect to the additional refraction error—for example, because of manufacturing fluctuations—the "reverse case" may also occur. For example, the refraction determination can in fact be carried out for infinite vision test distances, but subsequently the spectacle glass can be used only in a closed space. In this case, the spectacle glass already has a negative refraction error of 0.1 to 0.2 dpt in the distance, and 0.12 dpt may be added again because of measuring inaccuracies. If a negative desired refraction deviation in the far reference point is superimposed on such a spectacle glass, this may lead to incompatibilities, particularly in the case of higher additions because of the lack of accommodation capacity. Preferably, the introduced desired refraction superimposition should therefore be between 0.03 and 0.2 dpt, preferably between 0.08 and 0.12 dpt, in the far reference point.

Figure 6A:
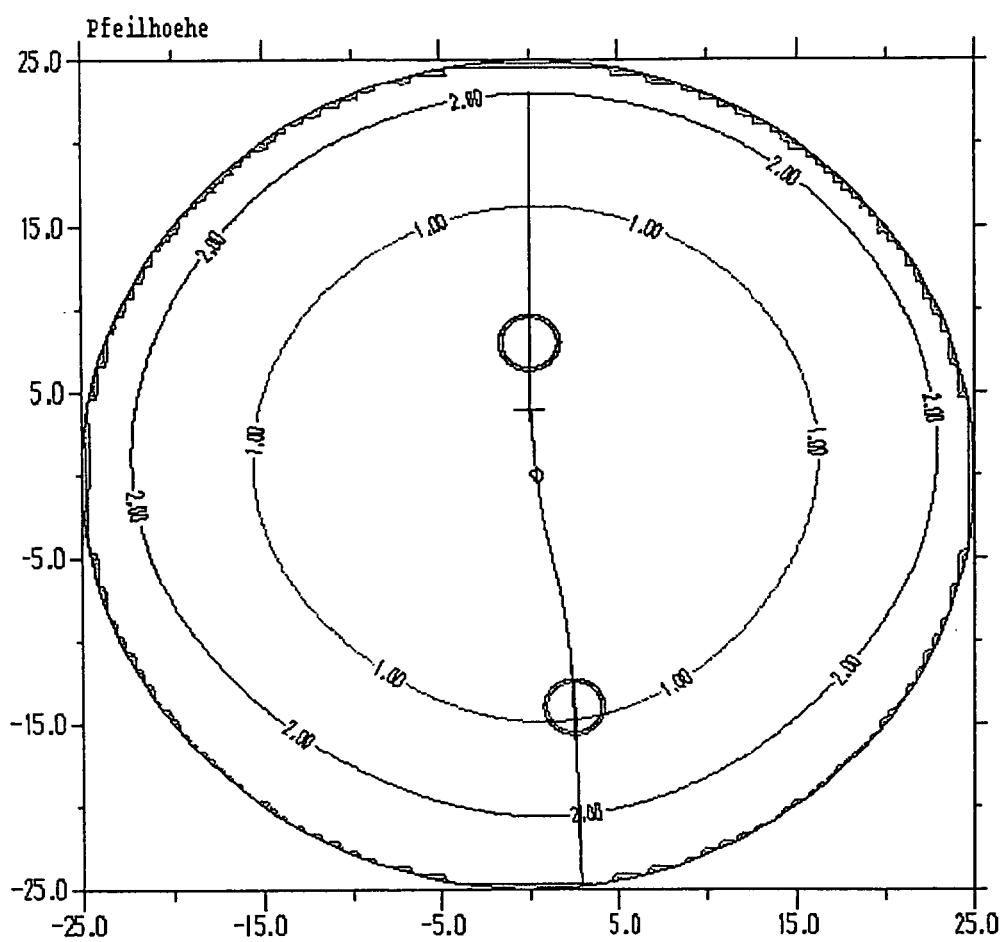
FIG. 6a is a view of the cambers of the preferred spectacle glass of the invention according to FIGS. 1b to 5b.
Figure 6B:
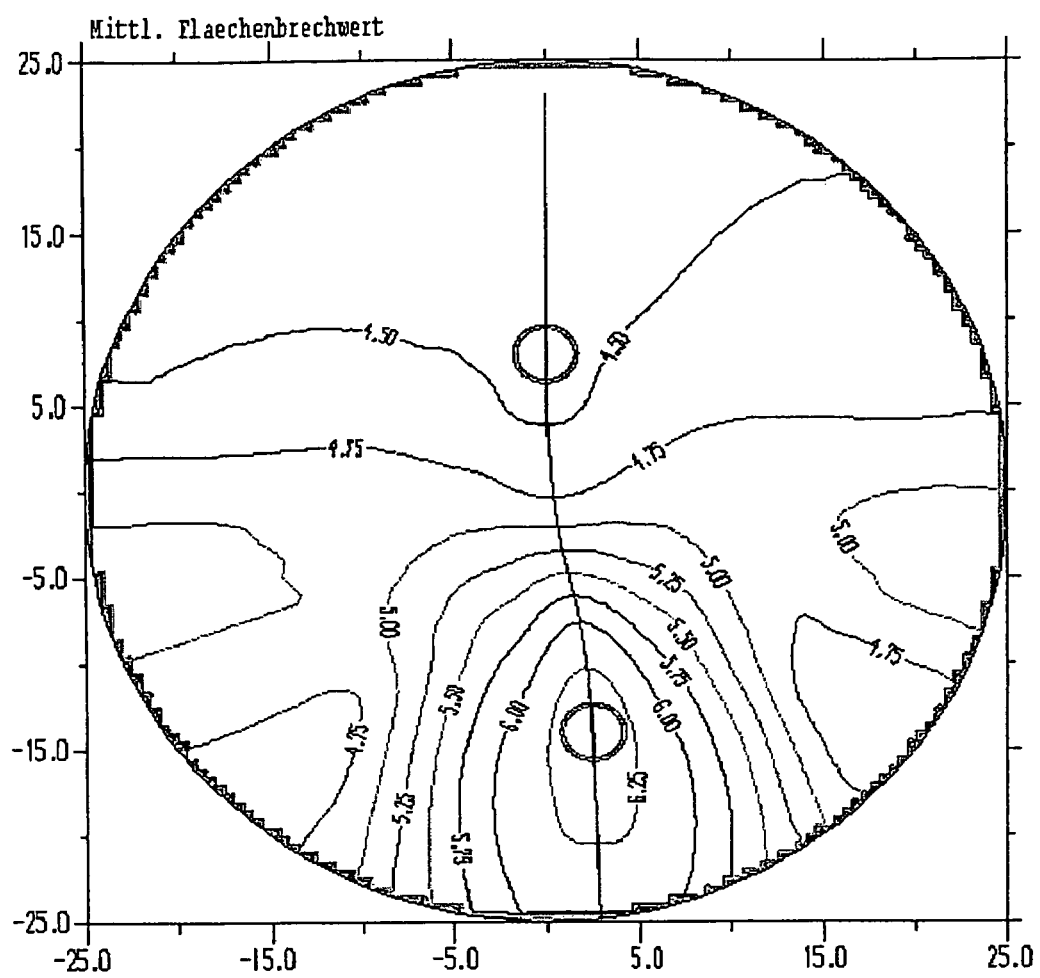
FIG. 6b is a view of the average surface refraction value of the preferred spectacle glass of the invention according to FIGS. 1b to 5b.
Figure 6C:
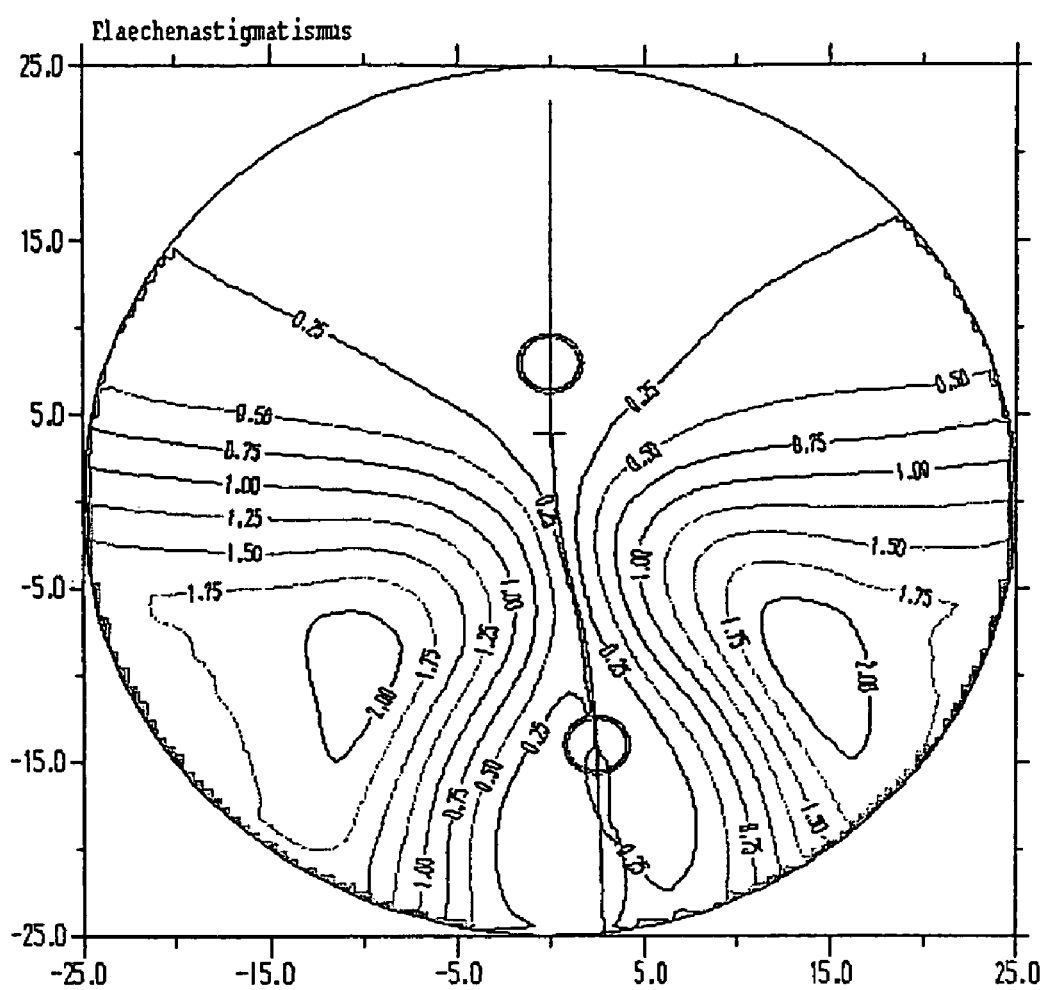
FIG. 6c is a view of the surface astigmatism of the preferred spectacle glass of the invention according to FIGS. 1b to 5b.

FIGS. 6a, b and c show the cambers, the average surface refraction value and the surface astigmatism of the above-described preferred spectacle glass according to the invention.

The invention claimed is:

1. Method of producing a progressive lens, comprising
defining an ordering value for the average use value in the far reference point of the progressive lens,
optimizing the progressive lens so as to include accounting for a calculation value of the average use value in the far reference point, the calculation value having a negative desired refraction deviation between 0.03 dpt and 0.2 dpt with respect to the ordering value in the far reference point;
wherein the optimizing takes into account a calculation addition that is increased at least by the amount of the negative desired refraction deviation in the far reference point with respect to the ordering addition.

2. Method according to claim 1, wherein the negative refraction deviation is between 0.08 dpt and 0.12 dpt.

3. Method according to claim 1,
wherein the calculation addition is increased with respect to the ordering addition by the sum
of the amount of the negative desired refraction deviation in the far reference point and
of a positive desired refraction deviation between 0.02 dpt to 0.1 dpt.

4. Method according to claim 3, wherein the positive desired refraction deviation amounts to approximately 0.05 dpt.

5. Method according to claim 1,
wherein the optimizing takes place while taking into account a predetermined desired refraction error on the main line as a function of the y-coordinate along a vertical section of the progressive lens.

6. Method according to claim 1,
wherein the optimizing takes place such that the average use value of the progressive lens when produced after optimizing increases as little as possible in the case of a horizontal viewing deflection in the far range.

7. Method according to claim 6,
wherein the optimizing takes place such that the average use value of the progressive lens after production thereof at the height of the far reference point in the case of a horizontal viewing deflection increases by less than 0.25 dpt, preferably less than 0.15 dpt, with respect to the average use value in the far reference point.

8. Progressive lens having a far part with a far reference point, a near part and a progression zone, the progressive lens being optimized by taking into account a calculation value of the average use value in the far reference point, the calculation value with respect to a predefined ordering value of the average use value in the far reference point having a negative desired refraction deviation of between 0.03 dpt and 0.2 dpt;
wherein the optimizing takes into account a calculation addition that is increased at least by the amount of the negative desired refraction deviation in the far reference point with respect to the ordering addition.

9. Progressive lens according to claim 8, wherein the negative refraction deviation is between 0.08 dpt and 0.12 dpt.

10. Progressive lens according to claim 8, wherein the progressive lens is optimized by taking into account a calculation addition which is increased at least by the amount of the negative desired refraction deviation in the far reference point with respect to the ordering addition.

11. Progressive lens according to claim 10, wherein the calculation addition with respect to the ordering addition is increased by the sum
of the amount of the negative desired refraction deviation in the far reference point and
of a positive desired refraction deviation between 0.02 dpt to 0.1 dpt.

12. Progressive lens according to claim 8,
wherein the progressive lens is optimized such that, in the case of a superimposition with a refraction error of +0.2 dpt, the far range is reduced by not more than 5%.

13. Method according to claim 2, wherein the optimizing takes into account a calculation addition that is increased at least by the amount of the negative desired refraction deviation in the far reference point with respect to the ordering addition.

14. Method according claim 2, wherein the optimizing takes into account a predetermined desired refraction error on the main line as a function of the y-coordinate along a vertical section of the spectacle glass.

15. Method according to claim 1, wherein the step of computing the progressive spectacle glass takes place while taking into account a predetermined desired refraction error on a main line as a function of the y-coordinate along a vertical section of the progressive lens.

16. Method according to claim 3, wherein the optimizing takes into account a predetermined desired refraction error on a main line as a function of the y-coordinate along a vertical section of the progressive lens.

17. Method according to claim 2, wherein the optimizing minimizes an increase in the average use value of the progressive lens when produced after optimizing in the case of a horizontal viewing deflection in the far range.

18. Progressive lens according to claim 9, wherein the progressive lens is optimized so as to take into account a calculation addition that is increased at least by the amount of the negative desired refraction deviation in the far reference point with respect to the ordering addition.

* * * * *